April 25, 1950     O. R. PETERSON     2,505,202
SELF-POWERED SCRAPER
Filed Jan. 11, 1947     3 Sheets-Sheet 1
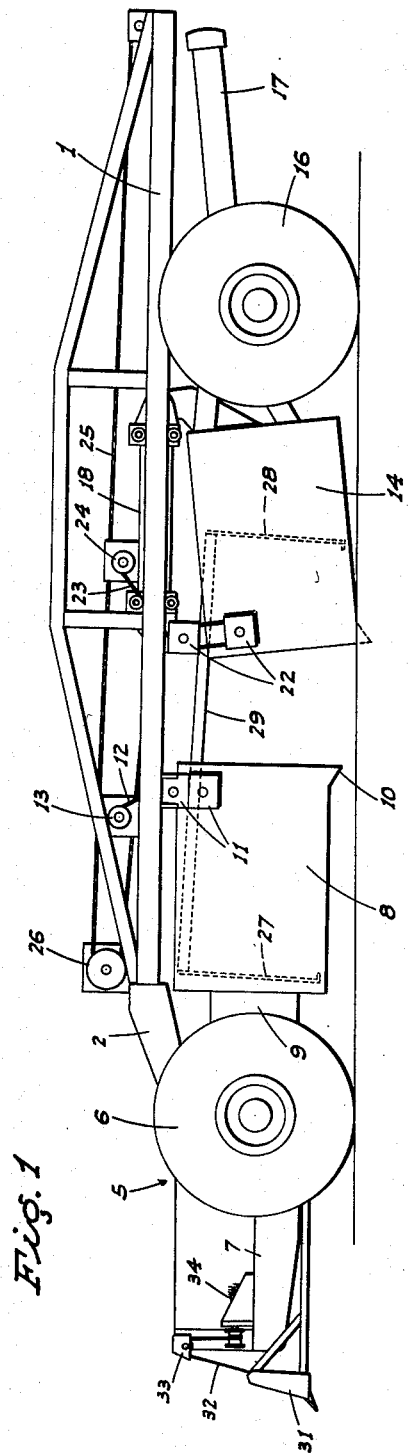
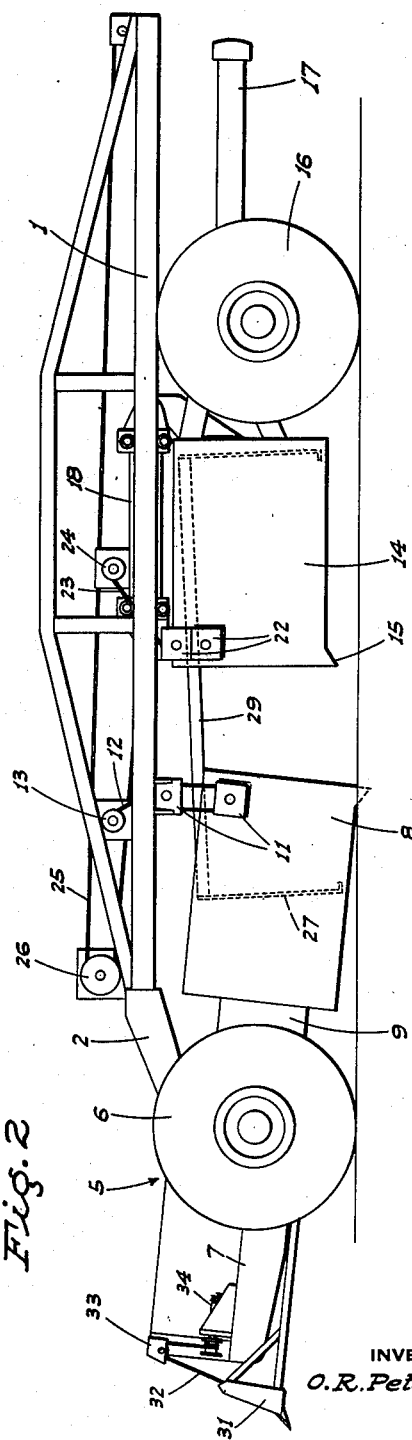
INVENTOR
O. R. Peterson
BY
ATTORNEYS

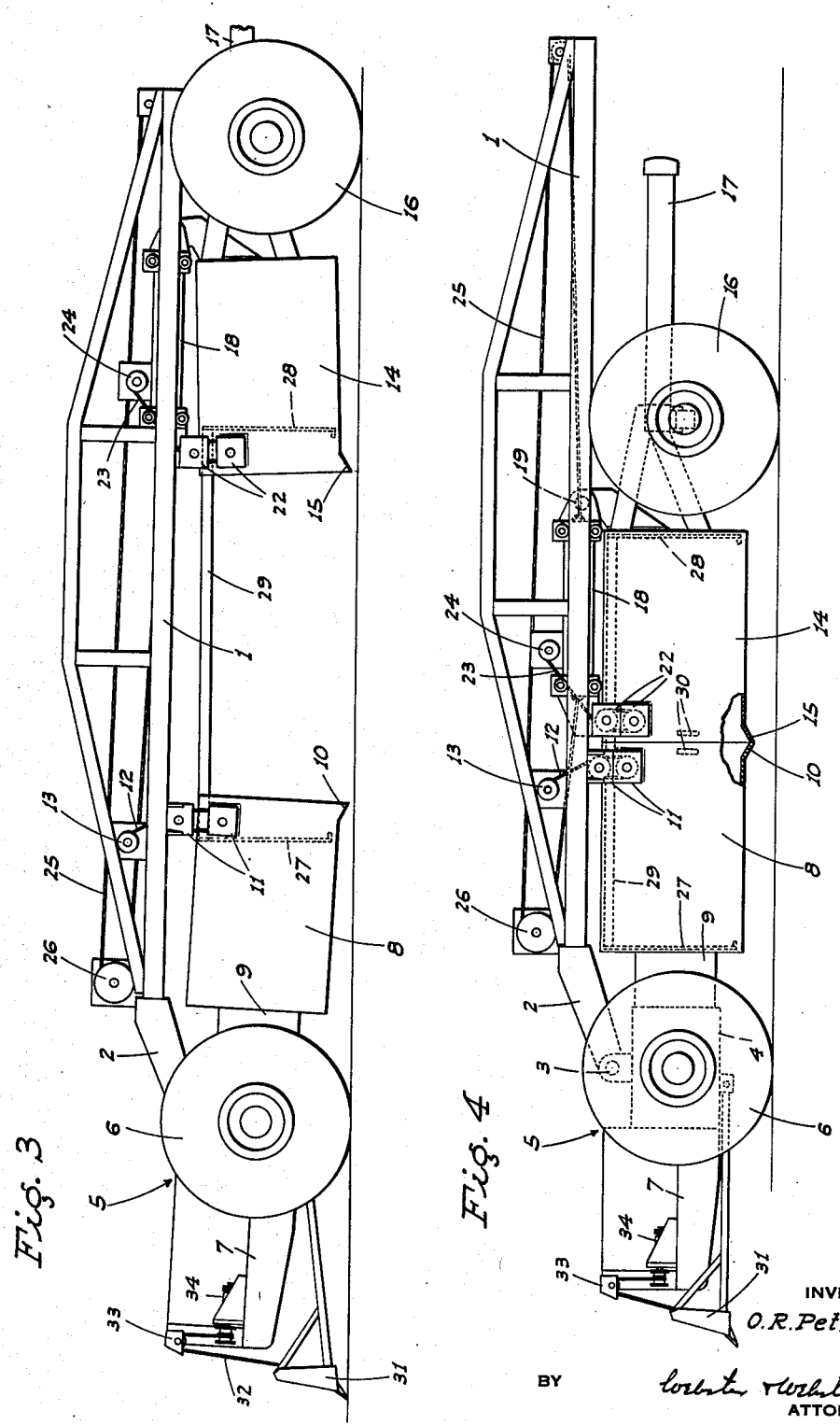

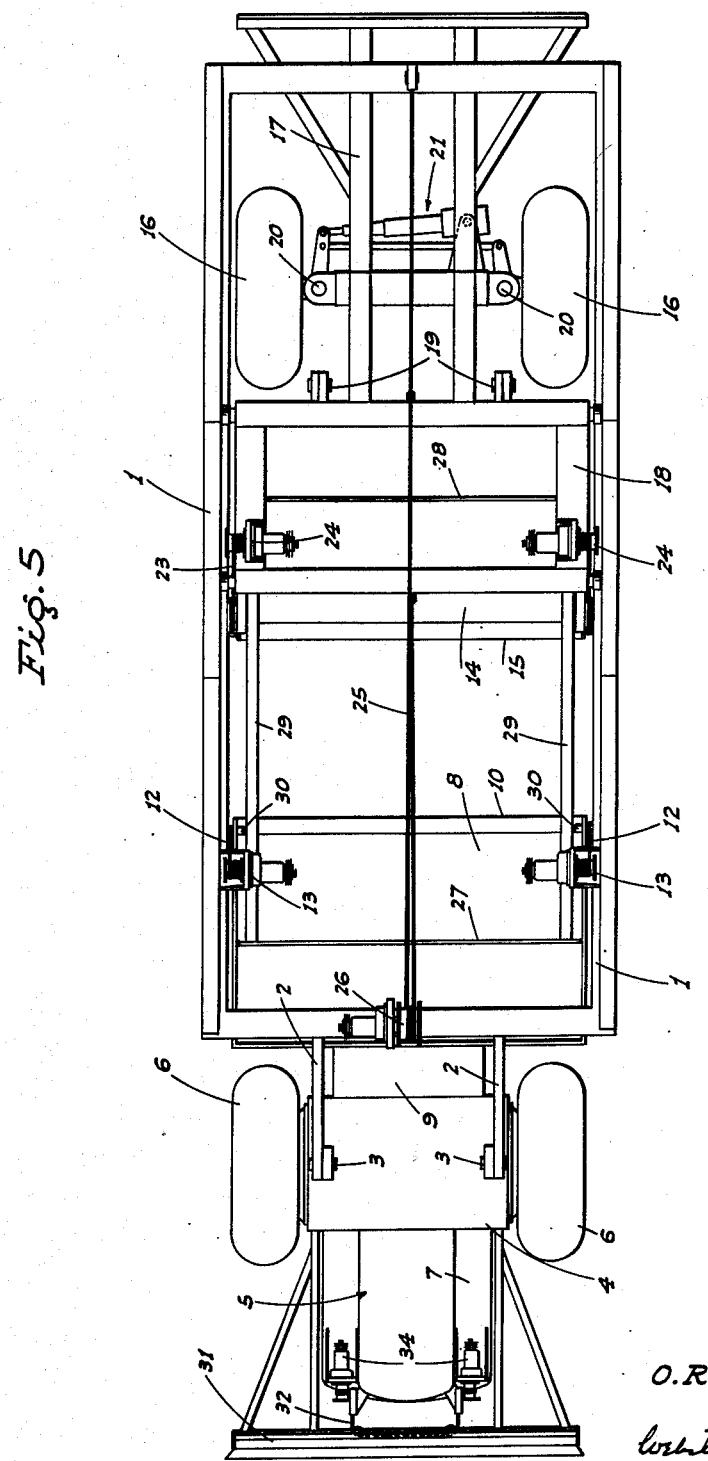

Patented Apr. 25, 1950

2,505,202

UNITED STATES PATENT OFFICE 2,505,202

SELF-POWERED SCRAPER

Oscar Raymond Peterson, Longview, Tex., assignor to R. G. Le Tourneau, Inc., Stockton, Calif., a corporation of California Application January 11, 1947, Serial No. 721,501

6 Claims. (Cl. 37—127)

This invention relates to, and it is an object to provide, an improved self-powered scraper for digging, carrying, and dumping earth.

Another object of this invention is to provide a scraper comprising, in novel combination, a two-wheel tractor, a main trailing frame, and a dual bowl assembly under the frame; the front bowl being rigidly mounted in connection with the tractor, the rear bowl being carriage mounted on the main frame for movement therealong relative to the front bowl, and both bowls being vertically adjustably suspended from said main frame for regulation of digging depth, carrying position, and unloading position.

A further object of the invention is to provide a scraper of the type described, wherein the rear, carriage mounted bowl is arranged with means to power actuate the same between retracted position and advanced position, whether or not the implement is traveling forward.

An additional object of the invention is to provide a scraper which is capable of effective loading while traveling forward or rearward; the implement being designed so that it may travel between a loading point and a dumping point without the necessity of turning around.

A further object of the invention is to provide a self-powered scraper which is practical and effective for the purpose for which it is designed.

These objects are accomplished by means of such structure and relative arrangement of parts as will fully appear by a perusal of the following specification and claims.

In the drawings:

Fig. 1 is a side elevation of the scraper with the rear bowl in digging and loading position.

Fig. 2 is a similar view, but shows the front bowl in digging and loading position.

Fig. 3 is a side elevation showing the bowls in full open or dumping position.

Fig. 4 is a side elevation of the implement with the bowls in closed, carrying position.

Fig. 5 is a plan view of the implement.

Referring now more particularly to the characters of reference on the drawings, the implement comprises an elongated main frame 1 of open construction and trussed, as shown.

At its forward end the main frame includes a pair of transversely spaced, forwardly projecting arms 2 relatively vertically swingably pivoted, as at 3, to the deck of the transmission housing 4 of a two-wheel tractor 5. The tractor includes a pair of transversely spaced supporting and drive wheels 6, and an engine mount 7 projects forwardly thereof.

The two wheel tractor is counterbalanced against falling at the front end by means of the front bowl 8 disposed to the rear of the wheels 6 and rigidly connected by a frame 9 to the transmission housing 4 of said tractor.

The front bowl opens rearward and includes a digging blade 10; such bowl being vertically adjustably suspended on opposite sides by multiple sheave and cable units 11, each of which includes a suspension cable 12 leading upward to a reversible electric winch 13 on the main frame. These winches 13 are actuated in unison to raise or lower the front bowl; said bowl being of sufficient weight that it tends to lower at all times.

A rear, forwardly opening bowl 14, including a digging blade 15, cooperates with the front bowl 8; such rear bowl 14 being frame-supported at the back by a pair of transversely spaced wheels 16; a pusher frame 17 projecting rearwardly of said wheels. Adjacent its rear end the rear bowl 14 is pivoted to a carriage 18, as at 19, for vertical adjustment. The wheels 16 are steerably mounted, as at 20, and are steered by an electric power unit, indicated generally at 21.

The rear bowl 14 is vertically adjustably suspended adjacent the front and on opposite sides by multiple sheave and cable units 22, each of which includes a cable 23 leading upward to a reversible electric winch 24 on the carriage 18. Operation of winches 24 adjusts the rear bowl between digging and carrying or dumping positions.

The carriage 18 is roller-mounted on the main frame 1 for motion lengthwise thereof, which motion is accomplished by a longitudinally extending, reversing cable system 25 connected at opposite ends to the carriage, and driven at the front end by a reversible electric winch 26 on the main frame.

End or push-out gates 27 and 28 are normally disposed adjacent the back of the front and rear bowls 8 and 14, respectively; said gates floating in said bowls for relative advancing movement to discharge a load from the latter. The endgates 27 and 28 are linked together at the top by longitudinal tie bars 29, and escape of said endgates from the bowls is prevented by stops 30 on the bowl side plates.

The tractor is equipped at the front with a vertically adjustable bulldozer 31 whose vertical adjustment is accomplished by lift cables 32 which pass over sheaves 33 and connect to reversible electric winches 34 on the tractor.

The reversible electric winches 13, 24, 26, and 34, each include a normally engaged brake which releases when the winch is energized, said winches being energized by an operator controlled circuit (not shown). The source of electric energy is a generator driven by the tractor.

Operation

The described scraper is operative to load upon forward or rearward travel, selectively, by lowering the rear bowl 14 or front bowl 8 to digging position, as shown in Figs. 1 and 2, respectively; the bowls remaining in adjacent relationship. By reason of the above, the implement can load and dump, in a cycle of movement, without turning around.

It should be noted that in either direction of travel the leading bowl acts as a load retaining apron for the then trailing or digging bowl.

To dump the bowls, the carriage is retracted on the main frame, which shifts the rear bowl 14 in a rearward direction, causing separation of said bowls, whereupon the linked-together endgates move to positions adjacent the open ends of the bowls, forcing or positively ejecting the loads therefrom. These endgates retract to normal positions when the gap between said bowls is closed.

If desired one implement can pusher-assist loading of bowl 14 of another like implement by engaging the bulldozer 31 with the frame 17 of said other implement.

Steering the implement from the rear wheels 16 is advantageous for the reason that the front wheels will bear the heavier load, and steering of the rear wheels will be accomplished with relatively less power and less wear on the tires.

The described scraper provides a practical and efficient implement for economical earth moving operations, and its double, reverse loading bowl assembly assures of a maximum load with each cycle between digging and dumping points. The advantage of relative great traction on wheels 6 is accomplished as the axis of said wheels forms the fulcrum for the rigid connected tractor and front bowl 8.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A scraper comprising a longitudinal main frame wheel supported rearwardly of its front end, a two wheel tractor, means pivotally connecting the frame at its front end to the tractor for relative vertical swinging motion, a scraper bowl disposed to the rear of the tractor under the frame, means rigidly connecting the bowl to the tractor, and means vertically adjustably connecting the bowl to the main frame; a second scraper bowl mounted in vertically adjustable connection with the frame to the rear of said first named bowl, said bowls being open and having digging blades at adjacent ends, and said second bowl carrying the main frame supporting wheels.

2. A scraper comprising a longitudinal main frame wheel supported rearwardly of its front end, a front bowl and a rear bowl under the frame, said bowls being open and having digging blades at adjacent ends, a two wheel tractor ahead of the bowls, means pivotally connecting the frame at its front end to the tractor for relative vertical swinging motion, means rigidly securing the front bowl to the tractor in counterbalancing relation thereto, means vertically adjustably connecting the front bowl to the main frame, and means vertically adjustably and longitudinally movably mounting the rear bowl in connection with said main frame.

3. A scraper comprising a longitudinal main frame wheel supported rearwardly of its front end, a front bowl and a rear bowl under the frame, said bowls being open and having digging blades at adjacent ends, a two wheel tractor ahead of the bowls, means pivotally connecting the frame at its front end to the tractor for relative vertical swinging motion, means rigidly securing the front bowl to the tractor in counterbalancing relation thereto, means vertically adjustably connecting the front bowl to the main frame, a power actuated carriage mounted on the main frame for movement lengthwise thereof, and means vertically adjustably mounting the rear bowl in connection with said carriage.

4. A scraper comprising a longitudinal main frame wheel supported rearwardly of its front end, a front bowl and a rear bowl under the frame, said bowls being open and having digging blades at adjacent ends, a two wheel tractor ahead of the bowls, means pivotally connecting the frame at its front end to the tractor for relative vertical swinging motion, means rigidly securing the front bowl to the tractor in counterbalancing relation thereto, means vertically adjustably connecting the front bowl to the main frame, a power actuated carriage mounted on the main frame for movement lengthwise thereof, and means vertically adjustably mounting the rear bowl in connection with said carriage; the rear bowl being provided with ground engaging wheels constituting the support for said rear bowl and the main frame.

5. In a scraper which includes a main frame, a pair of scraper bowls under the frame, said bowls being open at adjacent ends, means mounting the bowls in connection with the frame for relative separating and approaching movement selectively, a rear endgate in each bowl adapted for movement therethrough, the endgates being in opposite ends of the bowls when the latter are in adjacent relation, and tie means connected between said endgates arranged to maintain constant spacing therebetween, said tie means comprising a free floating rigid tie bar, the outer ends of the bar being each rigidly connected with one of the endgates.

6. In a scraper which includes a main frame, a pair of scraper bowls under the frame, said bowls being open at adjacent ends, means mounting the bowls in connection with the frame for relative separating and approaching movement selectively, a rear endgate in each bowl adapted for movement therethrough, the endgates being in opposite ends of the bowls when the latter are in adjacent relation, a free floating rigid tie bar, the outer ends of the bar being each connected with one of the endgates; there being stops on the bowls adjacent their open ends whereby to engage the endgates and prevent escape thereof from the bowls upon separation of the latter.

OSCAR RAYMOND PETERSON.

REFERENCES CITED

The following references are of record in the file of this patent:

UNITED STATES PATENTS

| Number | Name | Date |
| --- | --- | --- |
| 1,530,779 | Le Tourneau | Mar. 24, 1925 |
| 1,737,252 | Le Tourneau | Nov. 26, 1929 |
| 2,252,763 | French | Aug. 19, 1941 |
| 2,347,882 | Choate et al. | May 2, 1944 |
| 2,383,978 | Le Tourneau | Sept. 4, 1945 |
| 2,406,300 | Le Tourneau | Aug. 20, 1946 |